US008829743B2

(12) United States Patent
Watanabe et al.

(10) Patent No.: US 8,829,743 B2
(45) Date of Patent: Sep. 9, 2014

(54) COOLING STRUCTURE OF GENERATOR MOTOR AND GENERATOR MOTOR

(75) Inventors: Kouichi Watanabe, Hiratsuka (JP); Kouya Iizuka, Hiratsuka (JP); Takao Nagano, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/699,093

(22) PCT Filed: Mar. 26, 2012

(86) PCT No.: PCT/JP2012/057769
§ 371 (c)(1),
(2), (4) Date: Nov. 20, 2012

(87) PCT Pub. No.: WO2012/133321
PCT Pub. Date: Oct. 4, 2012

(65) Prior Publication Data
US 2013/0062977 A1    Mar. 14, 2013

(30) Foreign Application Priority Data

Mar. 31, 2011   (JP) ................................. 2011-080712

(51) Int. Cl.
*H02K 9/19* (2006.01)
*H02K 7/18* (2006.01)

(52) U.S. Cl.
CPC ................ *H02K 9/19* (2013.01); *H02K 7/1815* (2013.01)
USPC .............................. 310/54; 310/61; 310/60 A

(58) Field of Classification Search
USPC .......... 310/156.22, 216.114, 216.119, 62, 63, 310/57–59, 61, 60 A, 211
See application file for complete search history.

(56) References Cited

U.S. PATENT DOCUMENTS

| 872,708 | A | * | 12/1907 | Behrend ....................... 310/211 |
| 3,149,478 | A | * | 9/1964 | Anderson et al. ............... 62/469 |
| 4,600,848 | A | * | 7/1986 | Sutrina et al. ................... 310/54 |
| 5,796,190 | A | * | 8/1998 | Takeda et al. ................... 310/58 |
| 6,772,504 | B2 | | 8/2004 | Weidman et al. |
| 2009/0302720 | A1 | * | 12/2009 | Chiba ......................... 310/75 R |
| 2011/0001400 | A1 | | 1/2011 | Chiba et al. |
| 2012/0091833 | A1 | | 4/2012 | Hackett et al. |

FOREIGN PATENT DOCUMENTS

| DE | 102009001838 A1 | 9/2010 |
| JP | S60-162434 A | 8/1985 |
| JP | 2003-169448 A | 6/2003 |
| JP | 2007-006554 A | 1/2007 |

(Continued)

OTHER PUBLICATIONS

International Search Report dated May 22, 2012, issued for PCT/JP2012/057769.

(Continued)

*Primary Examiner* — Dang Le
(74) *Attorney, Agent, or Firm* — Edwards Wildman Palmer LLP

(57) ABSTRACT

A cooling structure of a generator motor includes: a rotor holder; a rotor core; a first blade; and a second blade, wherein the second blade includes a recessed coolant holding portion, provided on an outer circumference of the second blade on an opposite side to the rotor core and opening inward in the radial direction, for collecting a coolant, and a drain hole radially penetrating an outer circumference of the coolant holding portion for draining the coolant collected in the coolant holding portion.

9 Claims, 13 Drawing Sheets

(56) References Cited

FOREIGN PATENT DOCUMENTS

| | | |
|---|---|---|
| JP | 2007-020337 A | 1/2007 |
| JP | 2009-071905 A | 4/2009 |
| JP | 2010-263696 A | 11/2010 |
| WO | WO-2009/110437 A1 | 9/2009 |

OTHER PUBLICATIONS

Office Action dated Feb. 28, 2014 for corresponding German Patent Application No. 112012000031.5.

* cited by examiner

A-A

COOLING STRUCTURE OF GENERATOR MOTOR AND GENERATOR MOTOR

FIELD

The present invention relates to cooling of a generator motor with a coolant.

BACKGROUND

A generator motor is used for various applications, but produces heat by Joule heating of a coil provided to a stator, the eddy-current and hysteresis losses of a rotor core, and the like. For example, a technology for cooling a generator motor using a coolant, such as oil, that serves as a lubricant and a cooling oil in order to cool a generator motor is disclosed (Patent Literature 1).

CITATION LIST

Patent Literature

Patent Literature 1: Japanese Patent Application Laid-open No. 2009-071905

SUMMARY

Technical Problem

If a coil of a stator is lubricated with a coolant such as oil, the flow rates of coolants passing through coolant passages formed in a generator motor vary; accordingly, variations may occur in the cooling states of the coil of the stator. Especially, it is difficult to sufficiently supply a coolant to the stator on an internal-combustion engine side, and cooling may not be performed sufficiently. Patent Literature 1 describes a mechanism to supply a coolant to the coil of a stator, but is susceptible to improvement. An object of the present invention is to, if a coil of a stator of a generator is lubricated, reduce variations of the cooling states of the coil of the stator.

Solution to Problem

To overcome achieve the object, according to the present invention, a cooling structure of a generator motor including a coil of a stator, the coil being placed outside a rotor core in a radial direction, the cooling structure comprises: a rotor holder for rotating together with an input/output shaft of the generator motor and discharging, to outward in the radial direction by a centrifugal force, a coolant supplied from inward in the radial direction; a rotor core, supported outside the rotor holder in the radial direction, for rotating together with the rotor holder; a first blade, placed at an end in an axial direction of the rotor core, for holding one end of the rotor core; and a second blade, placed at an end in the axial direction of the rotor core, for holding the other end of the rotor core, wherein the second blade includes a recessed coolant holding portion, provided on an outer circumference of the second blade on an opposite side to the rotor core and opening inward in the radial direction, for collecting a coolant, and a drain hole radially penetrating an outer circumference of the coolant holding portion for draining the coolant collected in the coolant holding portion.

According to the present invention, the second blade has a part of an inner circumference surface for collecting the coolant of the coolant holding portion, the part being formed in a direction farther away from the rotor core than the rotor holder in the axial direction.

According to the present invention, the second blade has a plurality of protrusions extending in the axial direction, the protrusions being formed at the coolant holding portion at predetermined intervals in a circumference direction.

According to the present invention, the drain hole is adjacent to a surface on a front side of the protrusion in a rotation direction.

According to the present invention, a length in a radial direction of an outside end face in a radial direction of the first blade, a length in an axial direction of the outside end face of the first blade, a length in a radial direction of a portion extending radially inward at a farthest position from the rotor core of the first blade, and a length in an axial direction of the portion of the first blade are equal to those of the second blade.

According to the present invention, a surface on a side of the rotor core of a portion of the coolant holding portion, the portion extending radially inward at a farthest position from the rotor core, and a farthest surface of the rotor holder from the rotor core have a predetermined distance therebetween in the radial direction.

According to the present invention, a generator motor comprises the cooling structure of a generator motor.

According to the present invention, an end of the input/output shaft is coupled to an output shaft of a power generation source, and the other end of the input/output shaft is coupled to an input shaft of an object to be driven by power of the power generation source.

According to the present invention, the second blade is placed on a side of the power generation source of the rotor core.

If a coil of a stator of a generator motor is cooled, the present invention can reduce variations of the cooling states of the coil of the stator.

DESCRIPTION OF EMBODIMENTS

A detailed description will be given of a mode for carrying out the invention (embodiment) with reference to the drawings. The present invention is not limited by the contents described in the following embodiment. Moreover, elements described below include those that a person skilled in the art can easily assume and substantially identical ones. Furthermore, it is possible to combine the elements described below as appropriate. Moreover, various omissions, substitutions, or modifications of the elements can be made without departing from the gist of the invention.

<Hybrid Excavator>

Figure 1:
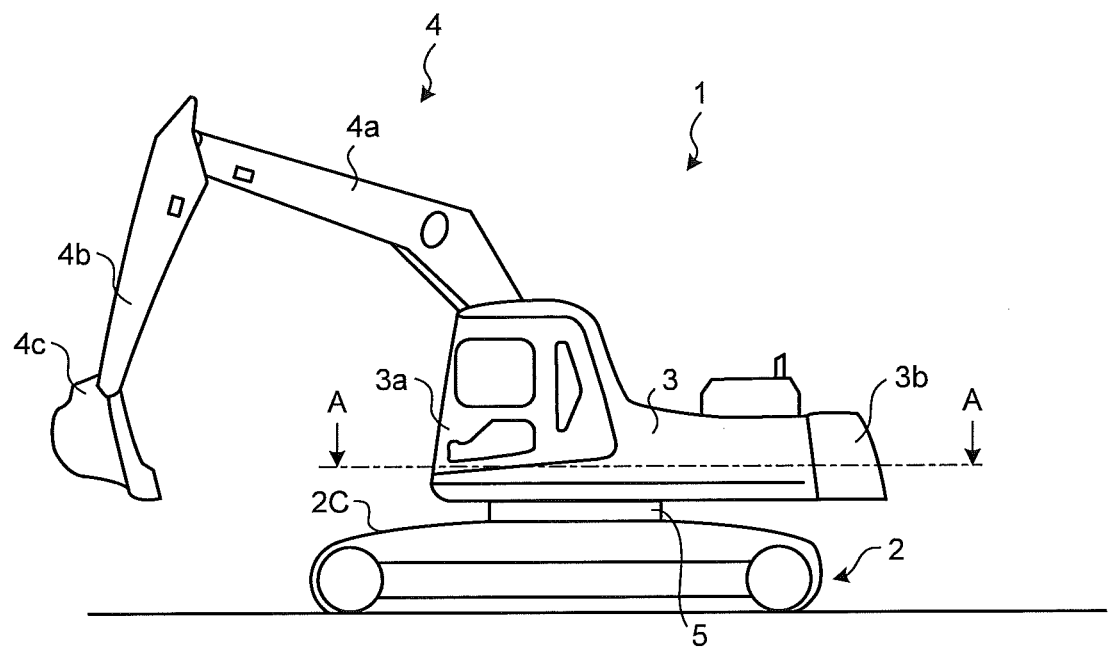
FIG. 1 is a side view illustrating a hybrid excavator using a generator motor according to an embodiment.
Figure 2:
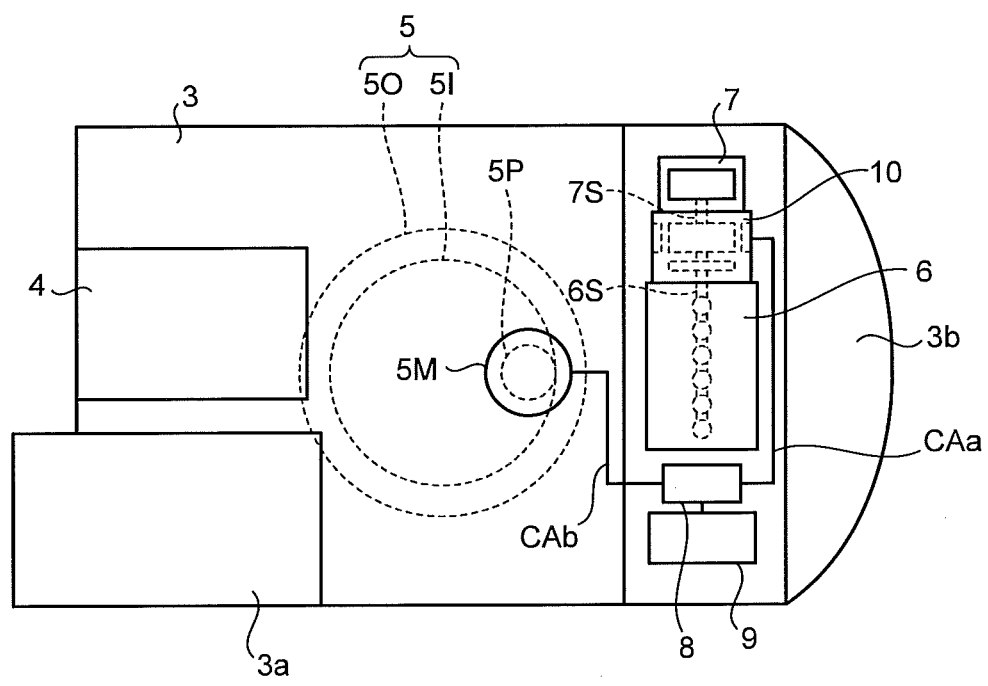
FIG. 2 is an arrow view A-A of FIG. 1.

FIG. 1 is a side view illustrating a hybrid excavator using a generator motor according to the embodiment. FIG. 2 is an arrow view A-A of FIG. 1. A hybrid excavator 1 is what is called a hybrid system construction vehicle that generates electric power by driving a generator motor by an internal-combustion engine, swings an upper structure by driving a motor by the electric power, and drives the auxiliary equipment of the hybrid excavator 1.

The hybrid excavator 1 includes an undercarriage 2 having a pair of left and right crawlers 2C, an upper structure 3, a working machine 4 including a boom 4a, an arm 4b, and a bucket 4c and attached to the upper structure 3, and a swing circle 5 connecting the undercarriage 2 with the upper structure 3. The pair of left and right crawlers 2C is driven by a right travel hydraulic motor and a left travel hydraulic motor to cause the hybrid excavator 1 to travel. The left and right travel hydraulic motors are supplied with hydraulic oil pumped from a hydraulic pump 7 illustrated in FIG. 2, and are driven.

The upper structure 3 is swung by a motor 5M (refer to FIG. 2) that functions as a swing motor. An outer race 5O of the swing circle 5 is secured to the upper structure 3. An inner race 5I of the swing circle 5 is secured to the undercarriage 2. With such a structure, the swing circle 5 connects the upper structure 3 with the undercarriage 2. An input/output shaft of the motor 5M is connected to a swing pinion 5P via swing machinery including a speed reduction mechanism. The swing pinion 5P meshes with internal teeth attached to the inner race 5I of the swing circle 5. The driving force of the motor 5M is transmitted to the swing pinion 5P via the swing machinery to swing the upper structure 3. In the embodiment, the motor 5M is installed such that the input/output shaft is oriented toward a direction in which gravity acts if placed in a vertical position, in other words, the hybrid excavator 1 is installed on a horizontal plane. The boom 4a, the arm 4b and the bucket 4c are driven by a boom 4a hydraulic cylinder, an arm 4b hydraulic cylinder, and a bucket 4c hydraulic cylinder via control valves, respectively, with hydraulic oil pumped from the hydraulic pump 7 illustrated in FIG. 2, and executes operations such as excavation.

The upper structure 3 is a substantially rectangular structure in planar view. A cab 3a of the upper structure 3 is placed on the left front of the upper structure 3 if the operator's main line of sight during the operation of the hybrid excavator 1 is set to the front. A counter weight 3b is placed on the rear of the upper structure 3. The upper structure 3 includes an internal-combustion engine 6 as a power generation source of the hybrid excavator 1, a generator motor 10 according to the embodiment, the hydraulic pump 7, an inverter 8, and a storage battery device 9 in addition to the cab 3a and the counter weight 3b.

The internal-combustion engine 6 is, for example, a diesel engine; however, the type of the internal-combustion engine 6 does not matter. The internal-combustion engine 6, the generator motor 10, the hydraulic pump 7, the inverter 8 and the storage battery device 9 are placed on the front of the counter weight 3b, in other words, on the cab 3a side. The generator motor 10 is placed between the internal-combustion engine 6 and the hydraulic pump 7. An output shaft 6S of the internal-combustion engine 6 is coupled to an input/output shaft of the generator motor 10, and the input/output shaft of the generator motor 10 is coupled to an input shaft 7S of the hydraulic pump 7. With such a structure, the internal-combustion engine 6 drives the generator motor 10 to generate electric power, and drives the hydraulic pump 7. In other words, the hydraulic pump 7 is driven via the generator motor 10. The generator motor 10 may be coupled indirectly to an output shaft of the engine via a PTO (Power Take Off).

A high voltage wire CAa electrically couples an input/output terminal of the inverter 8 to a power input/output terminal of the generator motor 10. A high voltage wire CAb electrically couples an output terminal of the inverter 8 to an input terminal of the motor 5M. The inverter 8 stores the electric power generated by the generator motor 10 in the storage battery device 9 such as a capacitor or secondary battery, and supplies the electric power to the motor 5M to drive this. Moreover, the inverter 8 stores in the storage battery device 9 the electric power obtained by the motor 5M converting the kinetic energy of the upper structure 3 into electric energy. The inverter 8 supplies the electric power stored in the storage battery device 9 to the motor 5M next time the upper structure 3 swings. The generator motor 10 receives the supply of electric power from the storage battery device 9 to operate as a motor, and can assist the internal-combustion engine 6 as necessary.

In this manner, the generator motor 10 according to the embodiment is applied to the hybrid excavator 1 being a kind of construction vehicle. An application target of the generator motor 10 is not limited to the hybrid excavator 1. For example, the generator motor 10 may set other hybrid construction machines such as a wheel loader as application targets.

<Generator Motor>

Figure 3:
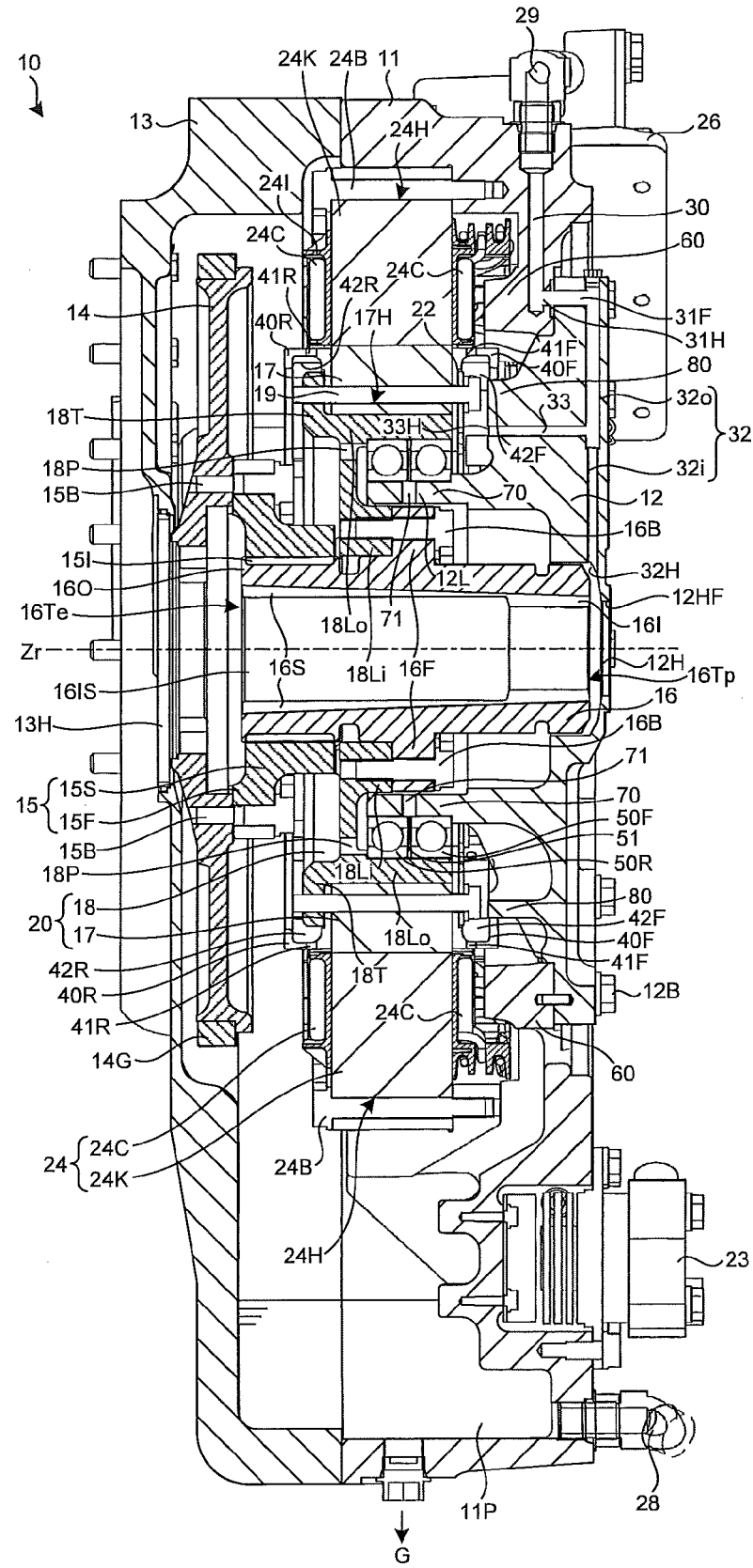
FIG. 3 is a cross-sectional view of the generator motor according to the embodiment.
Figure 4:
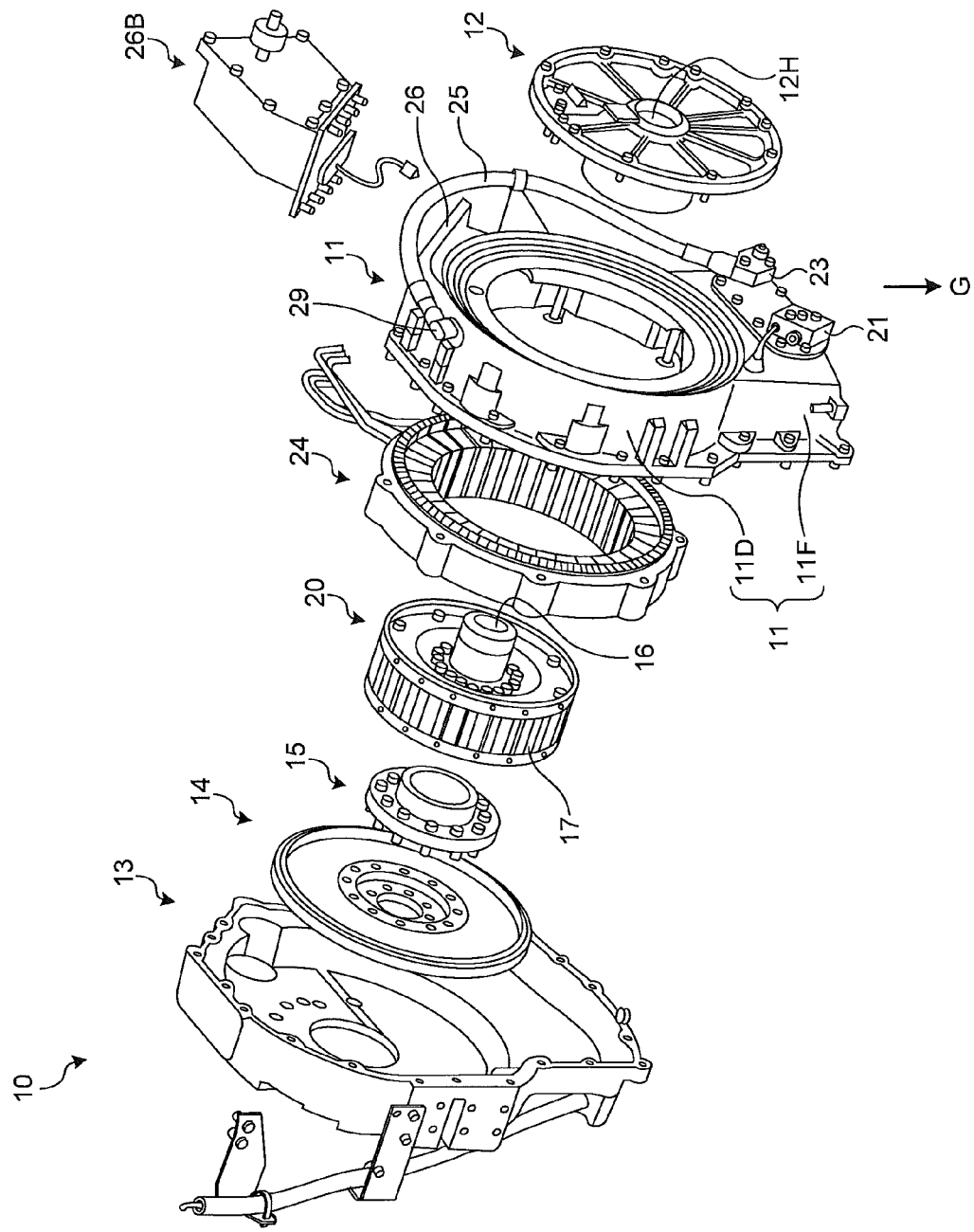
FIG. 4 is an exploded view of the generator motor according to the embodiment.
Figure 5:
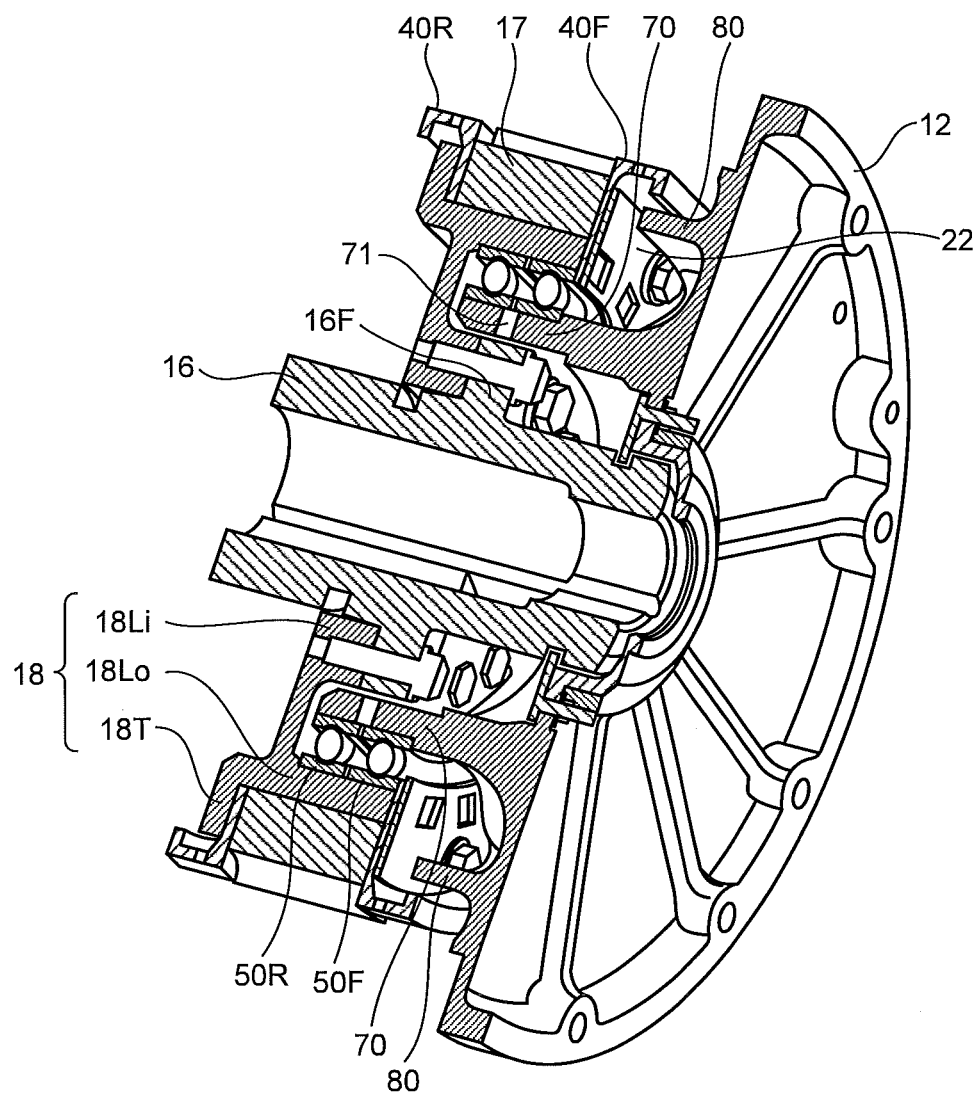
FIG. 5 is a perspective view illustrating the structures of an input/output shaft, a rotor, and a flange of the generator motor according to the embodiment.
Figure 6:
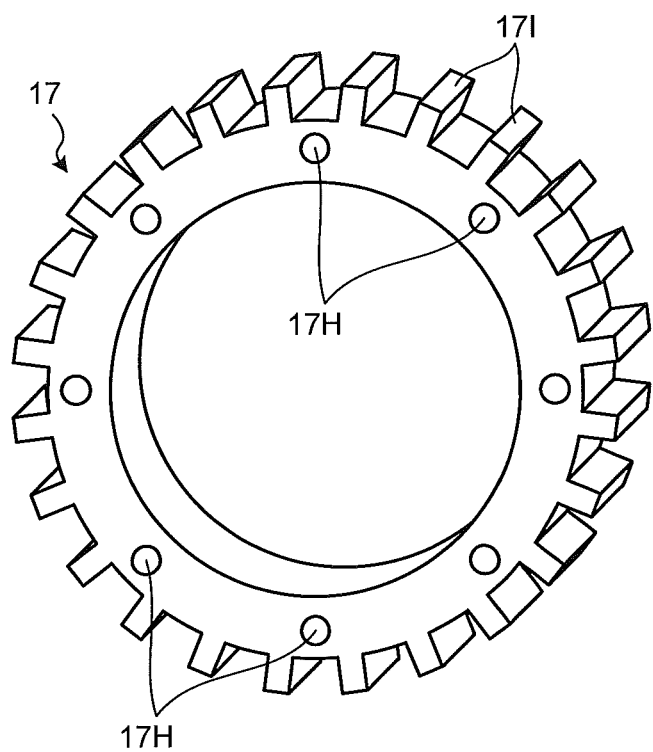
FIG. 6 is a perspective view illustrating a rotor core provided to the generator motor according to the embodiment.
Figure 7:
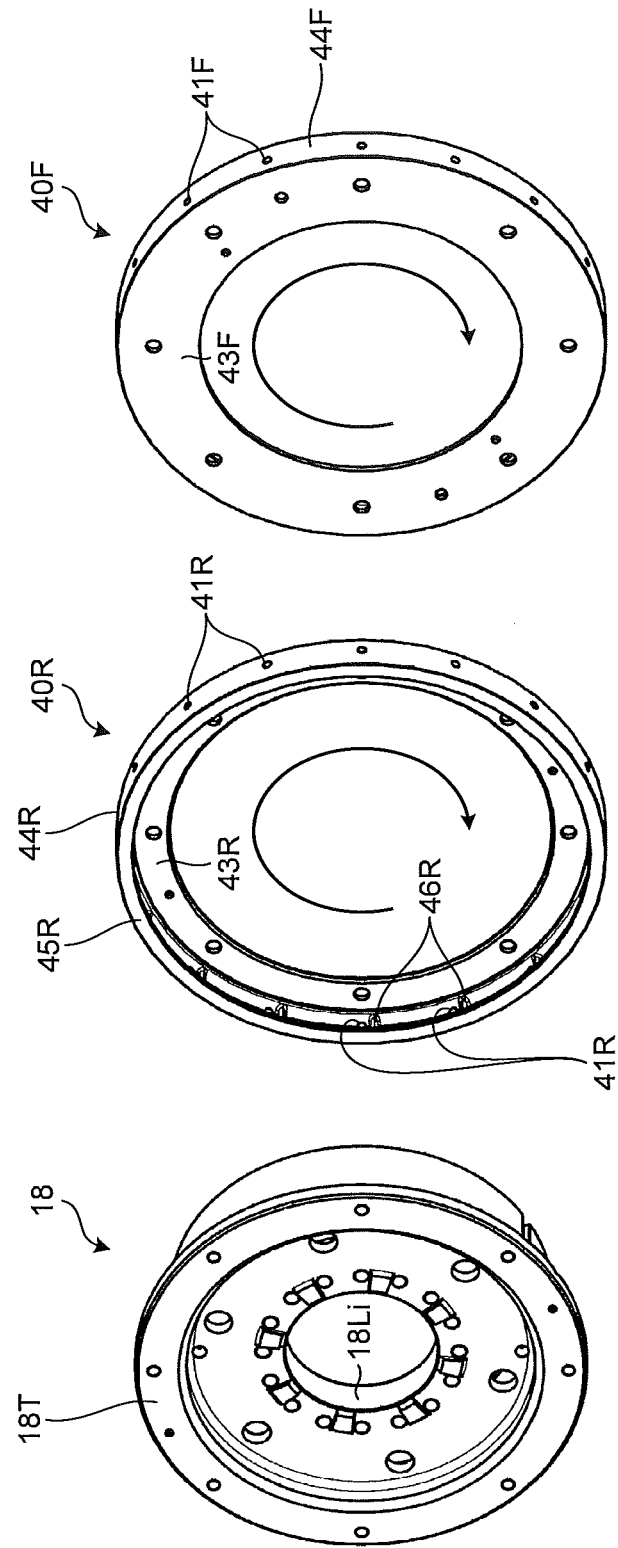
FIG. 7 is a perspective view illustrating a rotor holder and a blade, which are provided to the generator motor according to the embodiment.
Figure 8:
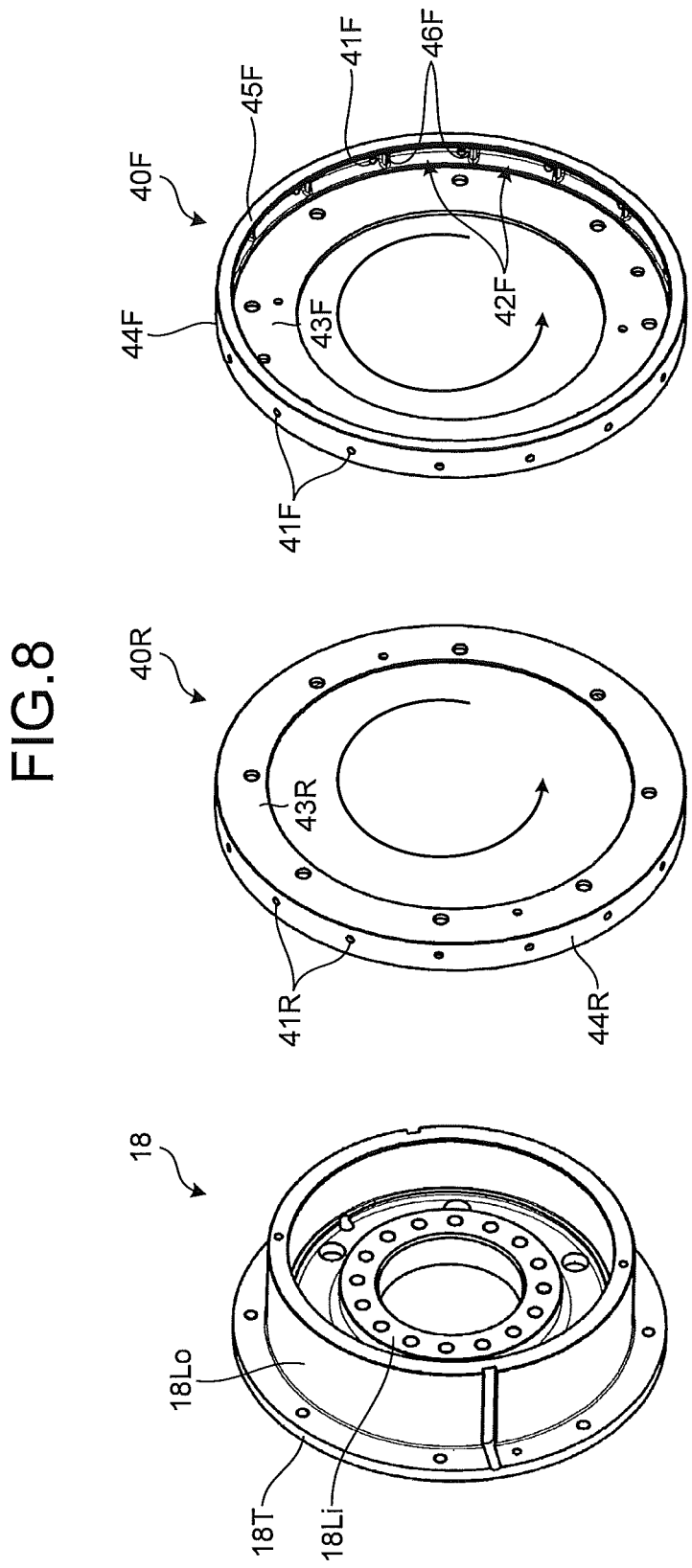
FIG. 8 is a perspective view illustrating the rotor holder and the blade, which are provided to the generator motor according to the embodiment.
Figure 9:
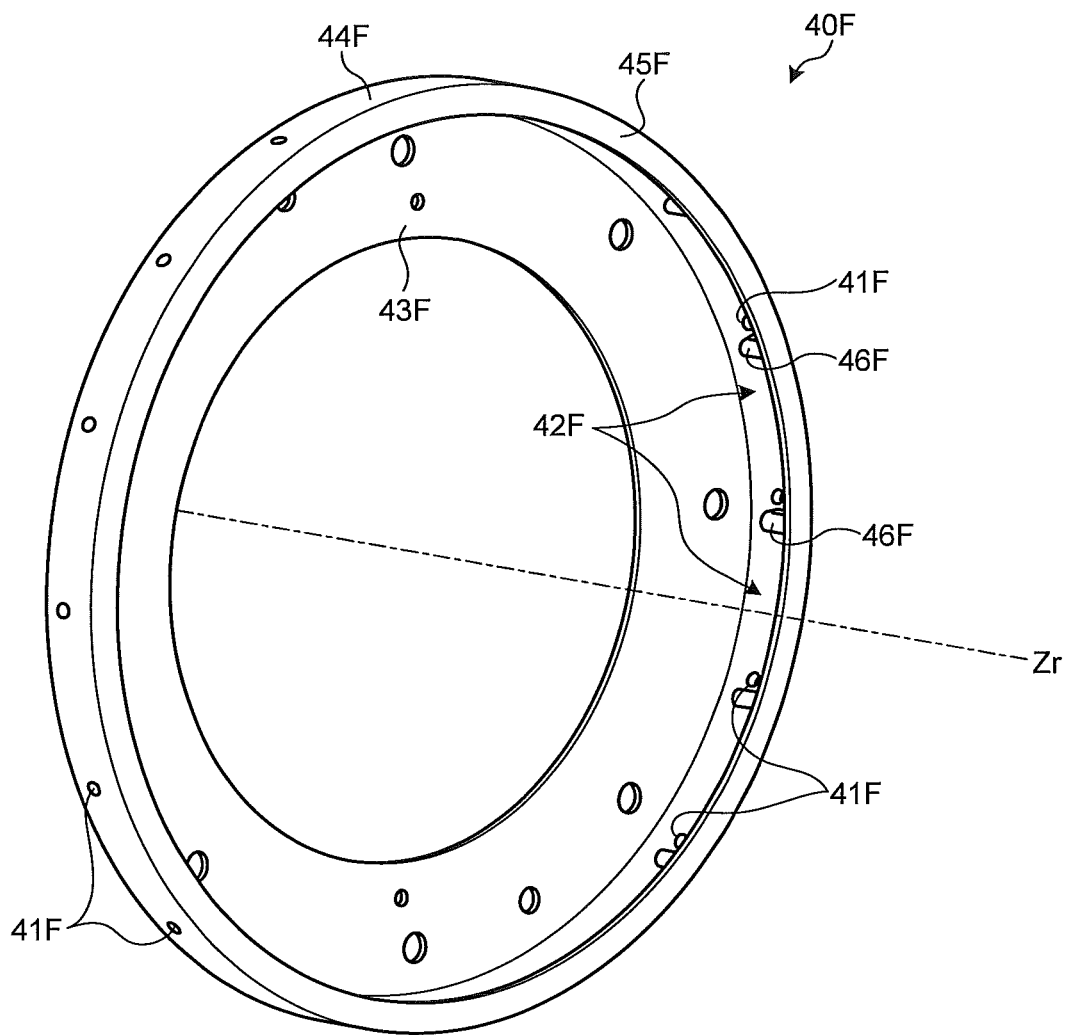
FIG. 9 is a perspective view illustrating the blade to be attached to the rotor core.
Figure 10:
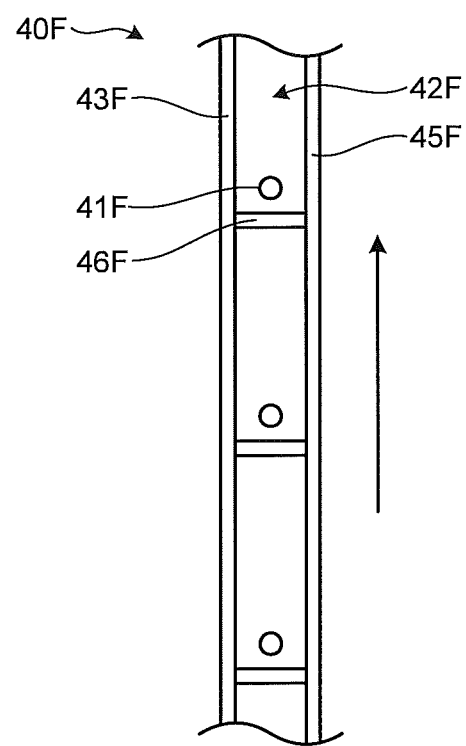
FIG. 10 is an explanatory view illustrating a state of when the blade is viewed from the inside diameter side.
Figure 11:
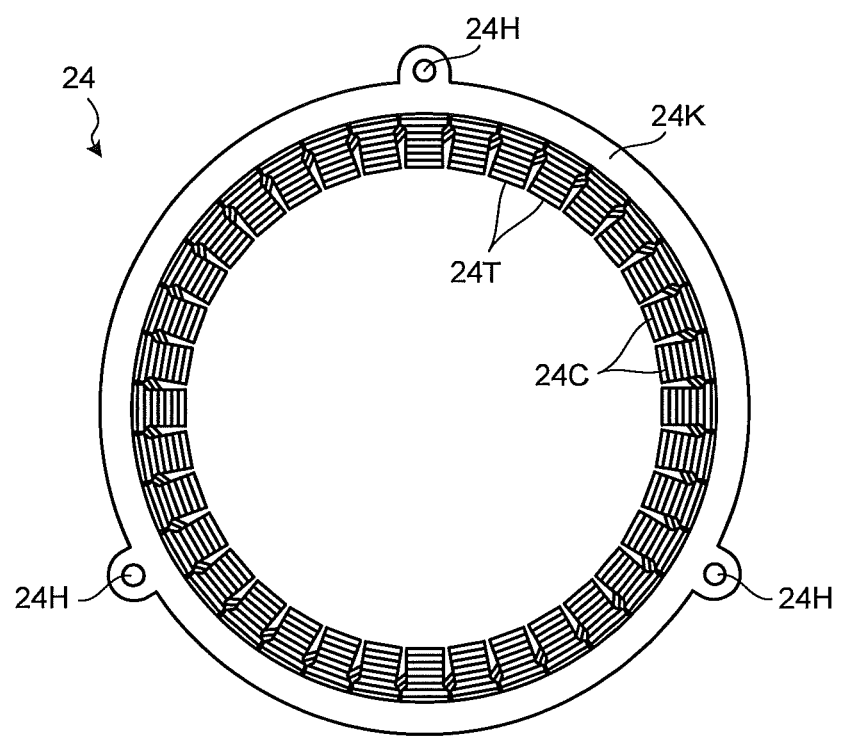
FIG. 11 is a front view of a stator provided to the generator motor according to the embodiment.
Figure 12:
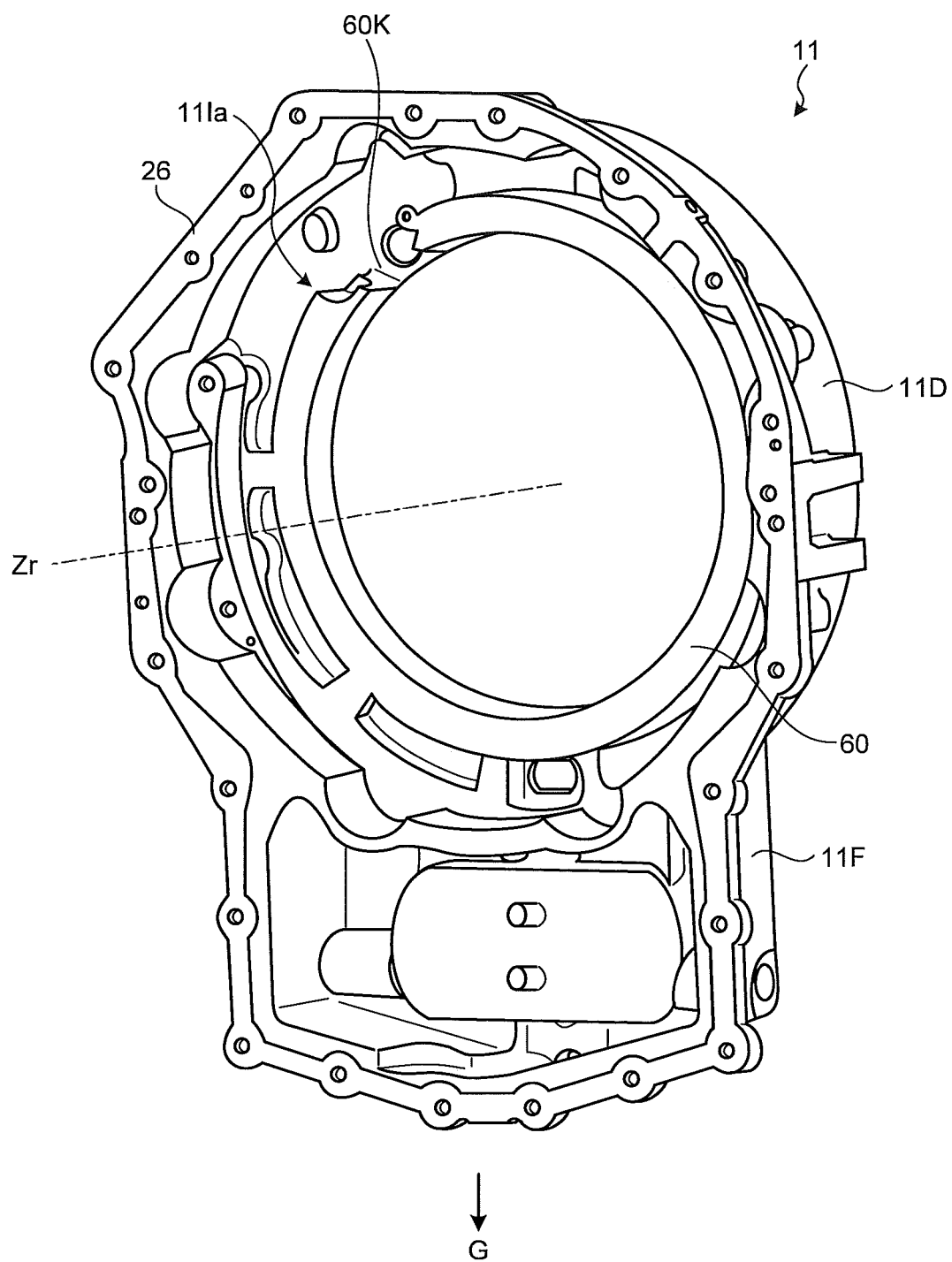
FIG. 12 is a perspective view of a first housing provided to the generator motor according to the embodiment.
Figure 13:
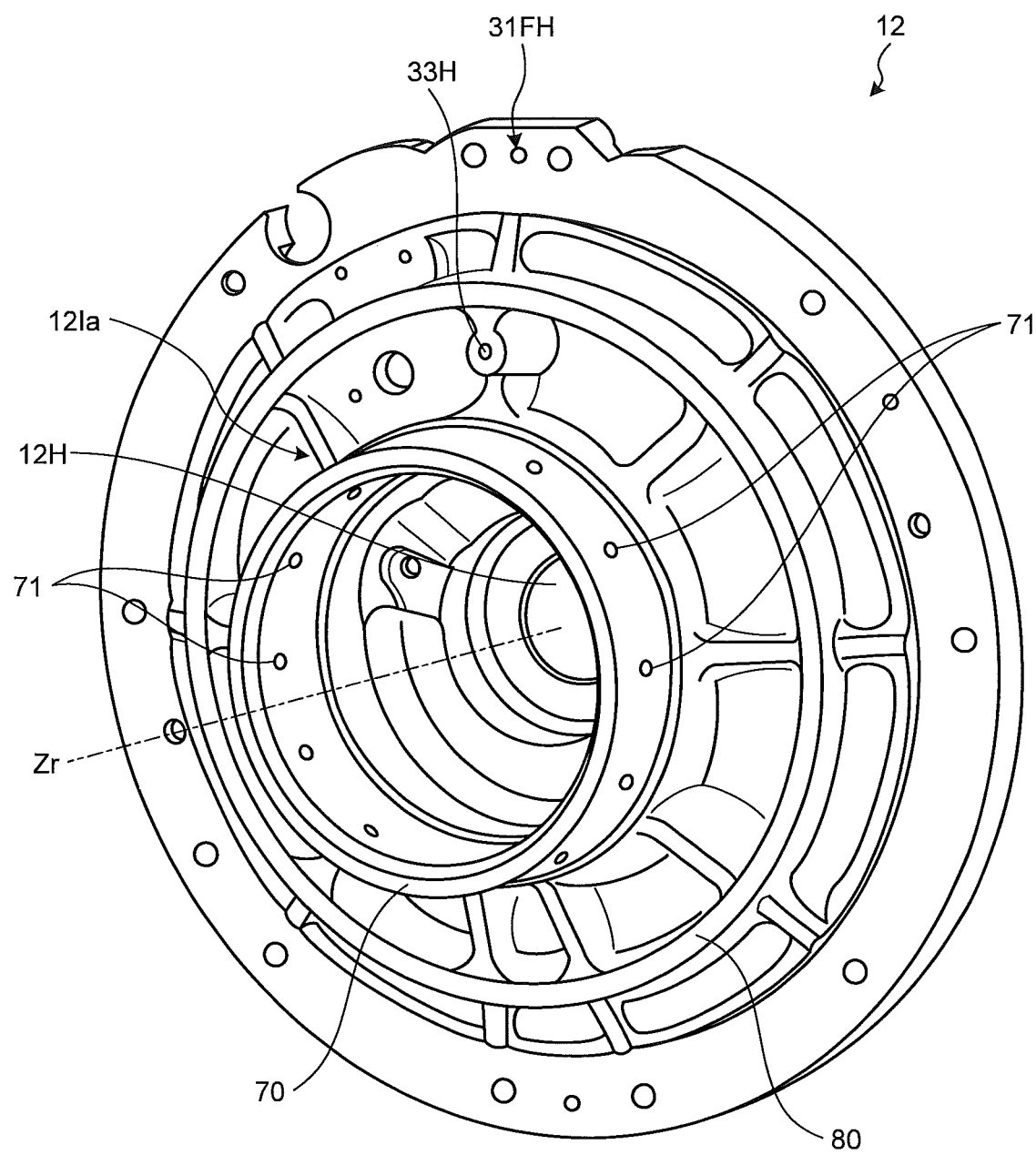
FIG. 13 is a perspective view of the flange provided to the generator motor according to the embodiment.

FIG. 3 is a cross-sectional view of the generator motor according to the embodiment. FIG. 3 illustrates a cross section of when the generator motor 10 is cut in a plane including a rotation center axis Zr of the generator motor 10 and in parallel with the rotation center axis Zr. FIG. 4 is an exploded view of the generator motor according to the embodiment. FIG. 5 is a perspective view illustrating the structures of an input/output shaft, a rotor, and a flange of the generator motor according to the embodiment. FIG. 6 is a perspective view of a rotor core provided to the generator motor according to the embodiment. FIG. 7 is a perspective view illustrating a rotor holder and a blade, which are provided to the generator motor according to the embodiment. FIG. 8 is a perspective view illustrating the rotor holder and the blade, which are provided to the generator motor according to the embodiment. FIG. 9 is a perspective view illustrating the blade to be attached to the rotor core. FIG. 10 is an explanatory view illustrating a state of when the blade is viewed from the inside diameter side. FIG. 11 is a front view of a stator provided to the generator motor according to the embodiment. FIG. 12 is a perspective view of a first housing provided to the generator motor according to the embodiment. FIG. 13 is a perspective view of the flange provided to the generator motor according to the embodiment.

As illustrated in FIG. 2, the generator motor 10 is placed between the internal-combustion engine 6 and the hydraulic pump 7. Electric power is generated by the power of the internal-combustion engine 6, and the power of the internal-combustion engine 6 is transmitted to the hydraulic pump 7. The generator motor 10 is cooled by a coolant such as oil, and the coolant lubricates portions requiring lubrication (sliding portions) such as bearings 50F and 50R, and a spline, which support an input/output shaft 16 rotatably.

As illustrated in FIGS. 3 and 4, the generator motor 10 includes a flywheel 14, a connection member 15, the input/output shaft 16, a rotor 20, a stator 24, a first housing 11 as a part of a housing, a flange 12 as an end side member (first end side member) to be placed at one end of the housing, that is, at one end of the first housing 11, and a second housing 13 placed at the other end of the first housing 11 to be a part of the housing.

The flywheel 14 is a disc-shaped structure, and is attached to the output shaft 6S of the internal-combustion engine 6 illustrated in FIG. 2. The flywheel 14 includes a starter gear 14G on its outer circumference. The starter gear 14G is an external ring gear. The starter gear 14G has a function of transmitting the power of a starter motor of the internal-combustion engine 6 to the output shaft 6S of the internal-combustion engine 6 to start the internal-combustion engine 6. The generator motor 10 may be operated as a motor to start the internal-combustion engine 6.

<Flywheel>

The flywheel 14 is attached to the connection member 15 with a plurality of bolts 15B. The flywheel 14 has a function of operating to improve the rotation efficiency of the internal-combustion engine 6 and a function of improving the power generation efficiency and the motor efficiency of the generator motor 10. The connection member 15 includes a substantially cylindrical main body portion 15S, and a circular flange portion 15F that overhangs outward in the radial direction of the main body portion 15S from one end side of the main body portion 15S. The flange portion 15F of the connection member 15 and the flywheel 14 are fastened with the bolts 15B to be secured. The main body portion 15S includes an internal spline 15I on its inner circumference.

<Input/Output Shaft>

The input/output shaft 16 is a cylindrical structure, and one end 16Tp is coupled to the input shaft 7S of the hydraulic pump 7, and the other end 16Te is coupled to the output shaft 6S of the internal-combustion engine 6. The input/output shaft 16 includes an internal spline 16I on its inner circumference on the one end 16Tp side and an external spline 16O on its outer circumference on the other end 16Te side. The internal spline 16I meshes with an external spline of the input shaft 7S of the hydraulic pump 7. The external spline 16O meshes with the internal spline 15I of the connection member 15. With such a structure, the power of the internal-combustion engine 6 is transmitted to the input/output shaft 16 via the flywheel 14 and the connection member 15, and the power of the internal-combustion engine 6 transmitted to the input/output shaft 16 is transmitted to the input shaft 7S of the hydraulic pump 7 via the internal spline 16I.

The input/output shaft 16 rotates about the rotation center axis Zr. The flywheel 14 and the connection member 15 also rotate about the rotation center axis Zr. The input/output shaft 16 includes a circular flange portion 16F that overhangs radially outward from its outer circumference. The flange portion 16F is a portion to which the rotor 20 to be described later is attached. Moreover, the input/output shaft 16 includes a shaft through hole 16IS that penetrates from the one end 16Tp to the other end 16Te. The shaft through hole 16IS serves as a passage of the coolant that cools the generator motor 10. The input/output shaft 16 includes grooves 16S formed on two places across its inner circumference surface from the one end 16Tp to the other end 16Te. The groove 16S becomes progressively deeper from the one end 16Tp toward the other end 16Te. With such a structure, it becomes easy for the coolant flowing from the one end 16Tp side to flow toward the other end 16Te; accordingly, cooling efficiency improves. In the embodiment, the example using the flywheel 14 has been described; however, the connection member 15 and the output shaft 6S of the internal-combustion engine 6 may be coupled with a spline or the like without using the flywheel 14.

<Rotor>

The rotor 20 includes a rotor core 17, and a rotor holder 18 as a rotor core holding member that holds the rotor core 17. The rotor core 17 is a structure where a plurality of steel sheets (magnetic steel sheets) is laminated. The direction in which the plurality of steel sheets is laminated (lamination direction) is in parallel with the rotation center axis Zr in a state where the rotor core 17 is attached to the input/output shaft 16. As illustrated in FIG. 6, the rotor core 17 is provided in a protruding manner with a plurality of (in this case, 24) inductors 17I with a predetermined pitch in the circumference direction of its outer circumference. A plurality of bolt holes 17H penetrates the rotor core 17 toward the lamination direction in the circumference direction. The inner circumference surface of the rotor core 17 is in contact with the outer circumference surface of the rotor holder 18.

As illustrated in FIGS. 5, 7, and 8, the rotor holder 18 includes a first holder member 18Li being a hollow disc-shaped structure, a second holder member 18Lo being a cylindrical structure provided to the outer circumference of the first holder member 18Li, and a third holder member 18T being a hollow disc-shaped structure provided to one end of the second holder member 18Lo, and extending outward in the radial direction of the input/output shaft 16. In the embodiment, they are manufactured of the same material integrally and inseparably. The material of the rotor holder 18 is, for example, steel, but is not limited to this. The rotor holder 18 is fastened to the flange portion 16F of the input/output shaft 16 with a bolt 16B. The rotor holder 18 rotates about the rotation center axis Zr, together with the input/output shaft 16. The first holder member 18Li includes an axial direction through hole 18P in parallel with the axial direction of the rotor holder 18 (the direction in parallel with the rotation center axis Zr). The axial direction through hole 18P serves as a passage of the coolant.

The rotor core 17 is attached to the outer circumference of the second holder member 18Lo. At this point, a rotor core mounting bolt 19 is inserted into the bolt hole 17H of the rotor core 17, and screwed in a tapped hole of the third holder member 18T; accordingly, the rotor core 17 is secured to the rotor holder 18. In the embodiment, the rotor core 17 is attached to the rotor holder 18 together with a first blade 40F and a second blade 40R in a state where the rotor core 17 is sandwiched between the first blade 40F and the second blade 40R from both sides of the lamination direction of the rotor core 17. The first blade 40F is placed on the flange 12 side, and the second blade 40R is placed on the second housing 13 side. Moreover, a sensor plate 22 to be used when the rotational speed of the input/output shaft 16 is detected is placed closer to the bolt head side of the rotor core mounting bolt 19 than the first blade 40F, and is attached to the rotor holder 18 with the rotor core mounting bolt 19. As illustrated in FIG. 5, the sensor plate 22 is a ring-shaped plate member, and includes a plurality of holes in its circumference direction. The plurality of holes is counted by an optical sensor, a magnetic sensor, or the like to detect the rotational speed of the input/output shaft 16 via the rotor holder 18.

The first blade 40F and the second blade 40R are ring-shaped members. As illustrated in FIGS. 5, 7, and 8, the first blade 40F and the second blade 40R are placed on axially both end faces of the rotor core 17, respectively. The second blade 40R is placed on a surface facing the third holder member 18T of the rotor holder 18, and the first blade 40F is placed on the opposite surface. The first blade 40F is placed axially closer to on a target to which the power is transmitted, in other words, the hydraulic pump 7 side than the rotor core 17. The second blade 40R is placed axially closer to the power generation source, in other words, the internal-combustion engine 6 side than the rotor core 17.

The first blade 40F and the second blade 40R have a function of holding the rotor core 17 including the plurality of steel sheets, a function of collecting a coolant supplied from the rotor holder 18 side and supplying the coolant to the stator 24, and a function of suppressing the leak of magnetic flux entering the rotor core 17, the magnetic flux being produced by the stator 24. FIGS. 9 and 10 illustrate only the first blade 40F; however, the second blade 40R also has a similar shape and dimension except the placement of coolant drain holes 41F and 41R and the dimension of an opening of the center. Therefore, with respect to the first blade 40F and the second blade 40R, a description will be given only of the first blade 40F as necessary. The first blade 40F placed on the flange 12 side has a smaller inside diameter of the opening than the second blade 40R since the first bearing 50F and the second bearing 50R are secured thereto.

The first blade 40F includes a first portion 43F, a second portion 44F, and a third portion 45F. The first portion 43F is a hollow disc-shaped portion in contact with one end of the rotor core 17. The second portion 44F is a cylindrical portion provided on the outer circumference of the first portion 43F and extending to an opposite side to the side in contact with the rotor core 17. The inner circumference of the second portion 44F is provided with a plurality of protrusions 46F in the circumference direction. The protrusions 46F protrude radially inward from the inner circumference of the second portion 44F. In the embodiment, the protrusions 46F are placed at substantially regular intervals in the circumference direction of the second portion 44F. The third portion 45F is a flanged and hollow disc-shaped portion provided at one end on an opposite side to the end of the first portion 43F of the second portion 44F and extending toward the rotation center axis Zr. The inside diameter of the third portion 45F is larger than that of the first portion 43F. In this manner, the first blade 40F has a shape that an area surrounded by the first portion 43F, the second portion 44F and the third portion 45F is recessed radially inward. The second blade 40R also includes a first portion, a second portion, and a third portion similarly to those of the first blade 40F.

All of the first portion 43F, the second portion 44F and the third portion 45F are manufactured of the same material integrally and inseparably. In the embodiment, the first blade 40F is manufactured by casting an aluminum alloy, for example. The first portion 43F, the second portion 44F and the third portion 45F of the blade 40F may be manufactured as separate members, and integrated by welding, fastening with a bolt, or the like.

Moreover, the second blade 40R also has a similar construction, and includes a first portion 43R, a second portion 44R and a third portion 45R. The second blade 40R is provided with a plurality of protrusions 46R in the circumference direction on the inner circumference of the second portion 44R.

As illustrated in FIGS. 7 and 10, the first blade 40F and the second blade 40R include coolant holding portions 42F and 42R that hold coolants on their outer circumferences. The coolant holding portion 42F is a portion surrounded by the first portion 43F, the second portion 44F, the third portion 45F and the adjacent two protrusions 46F. The coolant holding portion 42R is a portion surrounded by the first portion 43R, the second portion 44R, the third portion 45R and the adjacent two protrusions 46R. Moreover, the first blade 40F and the second blade 40R include the coolant drain holes 41F and 41R that penetrate radially outward on their outer circumferences. A plurality of the coolant drain holes 41F and 41R is provided in the circumference directions of the first blade 40F and the second blade 40R. Moreover, as illustrated in FIG. 10, the coolant drain holes 41F and 41R are formed adjacently to the front sides (the upstream sides, the sides that pass first upon rotation) of the protrusions 46F and 46R in the rotation directions of the first blade 40F and the second blade 40R, respectively. The coolant drain holes 41F and 41R are formed in the vicinity of ends on the downstream sides of the coolant holding portions 42F and 42R in the rotation directions of the first blade 40F and the second blade 40R. The coolants held by the coolant holding portions 42F and 42R drain from the coolant drain holes 41F and 41R by the centrifugal force caused by the rotation of the rotor 20 and are released outward in the radial directions of the first blade 40F and the second blade 40R. Preferably, the coolant drain holes 41F and 41R open toward coil ends, and more preferably are provided at positions facing the coil ends. By doing so, it is possible to concentrate on the coil ends upon the release of the coolants, and accordingly, it is possible to cool the coil ends more effectively.

The flywheel 14, the connection member 15, the input/output shaft 16, the rotor holder 18, the rotor core 17, the first blade 40F, the second blade 40R, the sensor plate 22, the bolts 16B and 19 that fasten them, and the like serve as rotation elements of the generator motor 10. Next, a description will be given of the stator 24.

<Stator>

As illustrated in FIG. 11, the stator 24 includes a stator core 24K and a coil 24C. The coil 24C is wound around the stator core 24K via an insulator 24I attached to the stator core 24K. The stator core 24K is a ring-shaped structure where a plurality of ring-shaped steel sheets (magnetic steel sheets) is laminated. On an inner circumference of the stator core 24K, a plurality of projections 24T protrudes toward the center with a predetermined pitch in the direction of the circumference of the stator core 24K. The protrusions 24T are part of the stator core 24K. Each projection 24T is the magnetic pole of the generator motor 10. Three coils are successively wound around the circumference surface of each projection 24T via the insulator 24I, as the coil 24C. Portions extending from both ends of the stator core 24K in the lamination direction of the ring steel sheets are the coil ends of the coil 24C.

The insulator 24I is a resin member, and is interposed between the coil 24C and the stator core 24K. The insulator 24I includes a notch in a portion overlapping with a coil end of the coil 24C. The coolant released from the rotating rotor 20 reaches the coil end through the notch. In this manner, the notch of the insulator 24I can supply the coolant from the rotating rotor 20 directly to the coil end; accordingly, it is possible to cool the coil end efficiently.

In the embodiment, the stator core 24K includes 36 protrusions 24T in total. With such a structure, a 3-phase, 12-pole SR (Switched Reluctance) motor is constructed. The embodiment is not limited to this, and may be, for example, a generator motor of another type such as a PM (Permanent Magnet) motor. Six coil terminals at both ends of the three-coil 24C are electrically coupled to a terminal connection portion provided to a connector box 26B (refer to FIG. 4) attached to a connector box base 26 provided to the housing 11. The six coil terminals are electrically coupled to the high voltage wire CAa illustrated in FIG. 2 via the terminal connection portion.

Bolt holes 24H are provided to a plurality of (three in the embodiment) protruding portions on an outer circumference of the stator core 24K. Each protruding portion is adapted to fit into a recess formed in the inner circumference of the housing 11. The protruding portions are fit into the recesses, respectively; accordingly, it is possible to position the stator core 24K relative to the housing 11. The positioned stator core 24K is attached to the housing 11 by a bolt 24B penetrating through the bolt hole 24H.

The generator motor 10 has the rotor 20 placed inside the stator 24. More specifically, the rotor core 17 is placed inside the stator core 24K. With such placement, the inductors 17I provided to the rotor core 17 face the protrusions 24T provided to the stator core 24K at predetermined intervals. As described above, the number of the projections 24T provided at regular intervals on the inner circumference of the stator core 24K and constructing magnetic poles is 36 in total. On the other hand, the number of the inductors 17I provided at regular intervals on the outer circumference of the rotor core 17 is 24 in total. In this manner, the generator motor 10 has a pitch difference between the number of the magnetic poles (protrusions 24T) of the stator core 24K, in other words, the pitch between each magnetic pole (each projection 24T) and the pitch between each inductor 17I of the rotor core 17. Next, a description will be given of the first housing 11, the flange 12, and the second housing 13 of the generator motor 10.

<First Housing>

As illustrated in FIGS. 12 and 4, the first housing 11 is a structure including a substantially cylindrical portion (cylindrical portion) 11D, and an overhanging portion 11F that overhangs outward in the radial direction of the cylindrical portion 11D from the cylindrical portion 11D, and includes openings at both ends. The first housing 11 has the flange 12 attached to one end, and the second housing 13 attached to the other end. The first housing 11 includes the rotor 20 and the stator 24 placed on the outer circumference of the rotor 20 therein. More specifically, the rotor 20 and the stator 24 are placed in a space enclosed by the first housing 11, the flange 12 and the second housing 13. As illustrated in FIG. 3, the portion of the overhanging portion 11F serves as an oil pan 11P as a coolant reservoir for collecting a coolant CL. The overhanging portion 11F of the first housing 11 is provided with a discharge passage 28 that causes the oil pan 11P to communicate with the outside. Moreover, it is possible to discharge the coolant in the oil pan 11P from a drain.

The first housing 11 includes a protruding portion 60 that protrudes from one end, in other words, an inner surface on the side to attach the flange 12 (flange side inner surface) 11Ia toward the stator 24. The protruding portion 60 is provided radially on the outer side than the first blade 40F attached to the rotor holder 18, and faces the coil 24C of the stator 24. The protruding portion 60 is provided along the stator 24. In other words, it is provided concentrically with the rotation center axis Zr as the center. The protruding portion 60 includes a partial notch portion 60K at a position of the connector box base 26. The conductor of the coil 24C illustrated in FIG. 3 is drawn out from the notch portion 60K. The top surface of the protruding portion 60, in other words, the surface facing the coil 24C is flat. Between the protruding portion 60 and the coil 24C is a passage through which the coolant passes. The top surface of the protruding portion 60 is placed closer to the rotor core 17 side, in other words, the coil 24C side, than the third portion 45F (refer to FIG. 7) of the first blade 40F. By doing so, it is possible to guide the coolant released from the coolant drain hole 41F of the first blade 40F to a coil end of the coil 24C. As a result, it is possible to cool a coil end more effectively.

A coolant supply port 29 is attached to a top of the first housing 11. The generator motor 10 is assumed to be used setting the overhanging portion 11F as a vertical direction (the direction in which gravity acts, the direction indicated by the arrow G in FIGS. 3 and 4) side. The top of the first housing 11 is a portion that becomes the highest from the installation plane when the overhanging portion 11F of the generator motor 10 is installed, oriented toward the vertical direction. The first housing 11 includes a coolant introduction passage 30 extending from the coolant supply port 29 toward the rotation center axis Zr of the input/output shaft 16. The first housing 11 includes a connecting passage 31H in the vicinity of the end of the coolant introduction passage 30, the connecting passage 31H extending toward and opening to the flange 12 side. The connecting passage 31H of the first housing 11 is coupled to a connecting passage 31F provided to the flange 12.

The coolant supply port 29 is coupled to a tube 25 as a coolant return passage. The coolant supplied from the coolant supply port 29 is collected in the oil pan 11P after cooling each portion of the generator motor 10. The coolant is transmitted from the discharge passage 28 to an oil cooler inlet 21 illustrated in FIG. 4 via an unillustrated filter and pump to be cooled there, and is subsequently supplied from the coolant supply port 29 again through an oil cooler outlet 23 and the tube 25. In this manner, the coolant circulates in the generator motor 10.

<Flange>

The flange 12 is attached by a plurality of bolts 12B to the opening at the one end of the first housing 11. The flange 12 is placed on the hydraulic pump 7 side which is illustrated in FIG. 2. The flange 12 includes a through hole 12H for attaching the input shaft 7S of the hydraulic pump 7 to the input/output shaft 16 of the generator motor 10, on an opposite side to the side to which the first housing 11 is attached. The input shaft 7S of the hydraulic pump 7 is attached to the input/output shaft 16 through the through hole 12H.

The flange 12 includes a bearing mounting member 70 extending outward in the radial direction of the flange portion 16F provided to the input/output shaft 16. The bearing mounting member 70 is a cylindrical member, and is integrally constructed with the flange 12 in the embodiment. The flange 12 and the bearing mounting member 70 as separate members may be integrated by fastening means such as a bolt or joint means such as welding. The bearing mounting member 70 protrudes from a surface of the flange 12 on the housing side of the generator motor 10 illustrated in FIG. 3, in other words, a surface on the first housing 11 side (housing side inner surface) 12Ia. The bearing mounting member 70 is placed between the first holder member 18Li of the rotor holder 18 and the flange portion 16F of the input/output shaft 16, and the second holder member 18Lo of the rotor holder 18. Moreover, the flange 12 is located at a position where a radial inner side on the hydraulic pump 7 side of the flange portion 16F overlaps with the internal spline 16I formed on the inner circumference on the one end 16Tp side of the input/output shaft 16. An overhanging portion 12HF extends up to a position overlapping with the internal spline 16I; accordingly, it is possible to make it difficult for the flange 12 to leak the coolant having flowed through an inside first passage 32$i$ to the hydraulic pump 7 side from between the flange 12 and the input/output shaft 16.

As illustrated in FIGS. 3 and 5, the first bearing 50F and the second bearing 50R are attached to the outer circumference of the bearing mounting member 70 with a ring- and plate-shaped spacer 51 interposed therebetween. The spacer 51 is placed on the outer ring sides of the first bearing 50F and the second bearing 50R. In the embodiment, both of the first bearing 50F and the second bearing 50R are deep groove ball bearings, but are not limited to the deep groove ball bearings. The first bearing 50F is placed on the flange 12 side, and the second bearing 50R is placed on the second housing 13 side. In the embodiment, the inner rings of the first bearing 50F and the second bearing 50R are attached to the bearing mounting member 70. The bearing mounting member 70 is placed on the outer circumference side of the input/output shaft 16. The outer rings of the first bearing 50F and the second bearing 50R are attached to the inner circumference of the second holder member 18L$o$ of the rotor holder 18. With such a structure, the first bearing 50F and the second bearing 50R are interposed between the bearing mounting member 70 and the rotor holder 18. The bearing mounting member 70 supports the rotor holder 18, the input/output shaft 16, the connection member 15 and the flywheel 14 rotatably via the first bearing 50F and the second bearing 50R.

The spacer 51 is interposed between the first bearing 50F and the second bearing 50R and on their outer ring sides; accordingly, there is a gap equal to the thickness of the spacer 51 between them. The bearing mounting member 70 includes a through hole 71 opening at a position of the gap. The through hole 71 serves as a passage of the coolant and supplies the coolant to the first bearing 50F and the second bearing 50R via the gap.

The flange 12 includes a rib 80 protruding toward the first blade 40F, at a position radially on the outer side than the bearing mounting member 70 and radially on the inner side than the first blade 40F attached to the rotor holder 18. The rib 80 is a cylindrical member formed concentrically with the rotation center axis Zr as the center, and is constructed integrally with the flange 12 in the embodiment. The flange 12 and the rib 80 as separate members may be integrated by fastening means such as a bolt or joint means such as welding.

The rib 80 faces the rotor 20. The top surface of the rib 80, in other words, the surface facing the rotor 20 is flat. Between the rib 80 and the rotor 20 is a passage through which the coolant passes. The top surface of the rib 80 overlaps with a part of the first blade 40F in a direction in parallel with the rotation center axis Zr of the input/output shaft 16. In other words, the top surface of the rib 80 is closer to the rotor 20 side (the coolant holding portion 42F side) than an end face of the first blade 40F on the flange 12 side. By doing so, it is possible to more securely guide the coolant into the coolant holding portion 42F of the first blade 40F.

The flange 12 includes the connecting passage 31F coupled to the connecting passage 31H of the first housing 11, a first passage 32 coupled to the connecting passage 31F, and a second passage 33 branching off from the first passage 32. As illustrated in FIG. 13, the connecting passage 31F opens to a part of the outer circumference of the flange 12. This opening serves as an inlet 31FH of the connecting passage 31F. The first passage 32 includes an outside first passage 32$o$ and the inside first passage 32$i$ coupled to the outside first passage 32$o$ and having a smaller inside diameter than the outside first passage 32$o$. The inside first passage 32$i$ is placed closer to the input/output shaft 16 side than the outside first passage 32$o$. The inside first passage 32$i$ of the first passage 32 opens to the input/output shaft 16 side of the flange 12, more specifically, a portion where a part of the input/output shaft 16 overlaps with the flange 12 in the rotation center axis Zr direction. The opening on the input/output shaft 16 side of the inside first passage 32$i$ is a first passage outlet 32H.

The second passage 33 branches off from the outside first passage 32$o$. In other words, the second passage 33 branches off before the inside diameter of the first passage 32 becomes smaller. The second passage 33 extends toward the rotor 20 attached to the outside of the input/output shaft 16 and opens to the rotor 20 side of the flange 12. The portion branching off from the first passage 32 is a second passage inlet 33I, and the opening on the rotor 20 side of the second passage 33 is a second passage outlet 33H (refer to FIGS. 3 and 13).

<Second Housing>

The second housing 13 is attached at the opening of the other end of the first housing 11. The second housing 13 is placed on the internal-combustion engine 6 side, the internal-combustion engine 6 being illustrated in FIG. 2. The second housing 13 includes a through hole 13H for attaching the output shaft 6S of the internal-combustion engine 6 to the input/output shaft 16 of the generator motor 10, on an opposite side to a side to which the first housing 11 is attached. The output shaft 6S of the internal-combustion engine 6 is attached to the flywheel 14 through the through hole 13H. Next, a description will be given of the route of the coolant in the generator motor 10.

<Route of Coolant>

The coolant having flowed from the coolant supply port 29 flows into the first passage 32 through the coolant introduction passage 30, and the connecting passages 31H and 31F. Part of the coolant having flowed into the first passage 32 branches into the second passage 33, and the rest flows into the inside first passage 32$i$, and flows out from the first passage outlet 32H. Part of the coolant flowed from the first passage outlet 32H flows into the shaft through hole 16IS from between the internal spline 16I of the input/output shaft 16 and the external spline of the input shaft 7S of the hydraulic pump 7 illustrated in FIG. 2. The rest passes through spaces between the input/output shaft 16 and the flange 12, and between the input/output shaft 16 and the bearing mounting member 70, and flows into the gap between the first bearing 50F and the second bearing 50R from the through hole 71 of the bearing mounting member 70.

It is preferable that the first passage outlet 32H should open at a position of the one end 16T$p$ of the input/output shaft 16. In other words, it is preferable that the first passage outlet 32H should open at a position of the coupling portion of the input/output shaft 16 and the input shaft 7S of the hydraulic pump 7 being an object to be driven by the internal-combustion engine 6. By doing so, it is possible to supply the coolant between the input/output shaft 16 and the input shaft 7S of the hydraulic pump 7, or more specifically, between the internal spline 16I of the input/output shaft 16 and the external spline of the input shaft 7S of the hydraulic pump 7 illustrated in FIG. 2. As a result, it is possible to efficiently introduce the coolant into the shaft through hole 16IS. Moreover, as described above, the overhanging portion 12HF provided to the through hole 12H of the flange 12 is regulated so as to prevent the coolant coming out from the outlet 32H from flowing to the hydraulic pump 7 side; accordingly, it is possible to efficiently introduce the coolant into the shaft through hole 16IS.

The coolant having flowed into the gap between the first bearing 50F and the second bearing 50R cools and lubricates the first bearing 50F and the second bearing 50R. Part of the coolant subsequently flows in between the bearing mounting member 70 and the rib 80. The rest of the coolant passes through the axial direction through hole 18P provided to the first holder member 18L*i* of the rotor holder 18. The coolant having flowed in between the bearing mounting member 70 and the rib 80 flows into the coolant holding portion 42F of the first blade 40F and subsequently flows out from the coolant drain hole 41F of the coolant holding portion 42F. The coolant is released outward in the radial direction of the rotor 20 due to the centrifugal force caused by the rotation of the rotor 20 and is dispersed on a coil end of the coil 24C for cooling. The coolant having cooled the coil end is collected in the oil pan 11P.

The coolant having passed through the axial direction through hole 18P provided to the first holder member 18L*i* flows along the third holder member 18T of the rotor holder 18, then flows into the coolant holding portion 42R of the second blade 40R, and flows out from the coolant drain hole 41R of the coolant holding portion 42R. The coolant is released outward in the radial direction of the rotor 20 due to the centrifugal force caused by the rotation of the rotor 20 and is dispersed on a coil end of the coil 24C for cooling. The coolant having cooled the coil end is collected in the oil pan 11P.

The coolant having flowed into the shaft through hole 16IS flows from the one end 16T*p* to the other end 16T*e* of the input/output shaft 16, and flows out from the other end 16T*e*. The coolant passes between the external spline 16O of the input/output shaft 16 and the internal spline 15I of the connection member 15, and flows between the connection member 15 and the rotor holder 18. The coolant flows radially outward along the first holder member 18L*i* and the third holder member 18T of the rotor holder 18, and subsequently flows into the coolant holding portion 42R of the second blade 40R, and flows out from the coolant drain hole 41R of the coolant holding portion 42R. The coolant is released outward in the radial direction of the rotor 20 due to the centrifugal force caused by the rotation of the rotor 20 and is dispersed on a coil end of the coil 24C for cooling. The coolant having cooled the coil end is collected in the oil pan 11P.

The coolant having passed through the second passage 33 flows out from the second passage outlet 33H and flows toward the rotor 20. The coolant having reached the rotor 20 is released outward in the radial direction of the rotor 20 due to the centrifugal force caused by the rotation of the rotor 20, and is dispersed on a coil end of the coil 24C on the flange 12 side for cooling. The coolant having cooled the coil end flows downward by the action of gravity, and is collected in the oil pan 11P. The coolant having been collected in the oil pan 11P is sent from the discharge passage 28 to the oil cooler inlet 21 illustrated in FIG. 4 via an unillustrated filter and pump, and is cooled there, and is subsequently supplied from the coolant supply port 29 again through the oil cooler outlet 23 and the tube 25.

Figure 14:
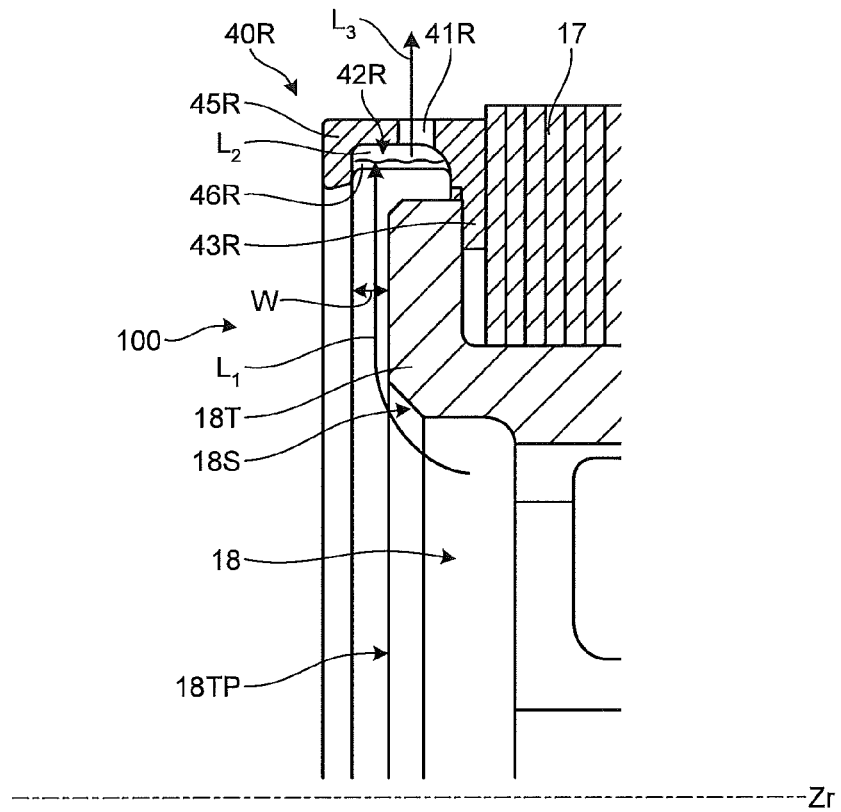
FIG. 14 is a view illustrating a cooling structure of the generator motor according to the embodiment.

Next, a description will be given of a cooling structure of a generator motor. FIG. 14 is a view illustrating a cooling structure of a generator motor according to the embodiment. As illustrated in FIG. 14, a cooling structure 100 of a generator motor according to the embodiment (hereinafter referred to as the cooling structure as necessary) is for supplying a coolant to the coil 24C of the stator 24 of the generator motor 10 illustrated in FIG. 3. The cooling structure 100 includes the rotor holder 18 and the second blade 40R.

As illustrated in FIG. 14, in the cooling structure 100, a coolant $L_1$ supplied by the centrifugal force caused by the rotation of the rotor 20 from the inside diameter side to the outside diameter side of the rotor holder 18 passes the area facing the third holder member 18T and reaches the coolant holding portion 42R of the second blade 40R. In the cooling structure 100, a coolant $L_2$ having reached the coolant holding portion 42R is collected in the coolant holding portion 42R. Furthermore, in the cooling structure 100, the coolant $L_2$ collected in the coolant holding portion 42R is supplied radially outward from the coolant drain hole 41R by the centrifugal force caused by the second blade 40R rotating together with the rotor 20, as a coolant $L_3$. The coolant $L_3$ having passed through the coolant drain hole 41R reaches the coil 24C of the stator 24 placed radially outside the second blade 40R. Consequently, the coil 24C is cooled by the coolant $L_3$.

In this manner, in the cooling structure 100, the coolant holding portion 42R is provided to the second blade 40R, and the coolant supplied by the centrifugal force from the axial center side is collected and collected in the coolant holding portion 42R, and is supplied radially outward from the coolant drain hole 41R; accordingly, it is possible to efficiently collect the coolant supplied by the centrifugal force from the axial center side and supply the coolant to the coil 24C of the stator 24. For example, the coolant is temporarily captured at the second blade 40R; accordingly, the coolant flying toward an area on a radial outer side than the coil 24C, in other words, the coolant that does not go toward the coil 24C can be captured in the coolant holding portion 42R, and supplied to the coil 24C of the stator 24. Moreover, the second blade 40R can supply the coolant to the entire circumference of the coil 24C of the stator 24, including also an upper portion in the vertical direction due to rotation. Consequently, it is possible to cool the coil 24C of the stator 24 efficiently.

As in the embodiment, the cooling structure 100 can more suitably obtain the effect that can cool the coil 24C of the stator 24 efficiently by constructing the second blade 40R on the internal-combustion engine 6 side of the coolant holding portion 42R and the coolant drain hole 41R. The cooling structure 100 of the embodiment can cool the coil 24C of the stator 24 efficiently by forming also the first blade 40F on the hydraulic pump 7 side into a similar shape.

Here, as illustrated in FIG. 14, in the cooling structure 100, a part of an inner circumference surface of the coolant holding portion 42R, the inner circumference surface collecting the coolant, (the recessed inner circumference surface) is formed in a direction farther away from the rotor core 17 than the third holder member 18T of the rotor holder 18, in the direction of the rotation center axis Zr. In other words, the cooling structure 100 has a shape that a surface on the rotor core side of the portion (the flanged and hollow disc-shaped portion, the third portion) extending radially inward (toward the rotation center axis Zr) at the farthest position of the coolant holding portion 42R from the rotor core 17 is axially farther away from the rotor core 17 than the farthest surface of the third holder member 18T from the rotor core 17. Moreover, in the cooling structure 100, a distance W in the axial direction between the surface on the rotor core side of the disc-shaped portion provided to the coolant holding portion 42R and the farthest surface of the third holder member 18T from the rotor core 17 is equal to a certain distance or longer. In short, the cooling structure 100 has a shape that a part of the inner circumference surface of the coolant holding portion 42R of the second blade 40R, the inner circumference surface collecting the coolant, is not hidden by the third holder member 18T when the second blade 40R is viewed from the axial center in a direction orthogonal to the axial direction.

In this manner, the cooling structure 100 is formed into a shape that the surface on the rotor core side of the portion extending radially inward at the farthest position of the coolant holding portion 42R from the rotor core 17 (in other words, the farthest surface from the rotor core 17 among the inner circumference surface of the coolant holding portion 42R, the inner circumference surface collecting the coolant) is axially farther away from the rotor core 17 than the farthest surface of the third holder member 18T from the rotor core 17, and accordingly can appropriately capture, at the coolant holding portion 42R, the coolant passing in front of the third holder member 18T to be supplied by the centrifugal force from the center of the rotor holder 18. Consequently, it is possible to capture the coolant more securely and cool the coil 24C of the stator 24 more efficiently.

The cooling structure 100 can more suitably obtain the effect that can cool the coil 24C of the stator 24 efficiently by being formed into a shape that the relative positional relationship between the second blade 40R and the third holder member 18T satisfies the above relationship as in the embodiment. The cooling structure 100 of the embodiment has a structure where also with respect to a relative positional relationship with a specific member (the sensor plate 22 in the embodiment) placed closer to the rotation center axis Zr side than the outer circumference of the first blade 40F in the radial direction of the first blade 40F, whose surface on the rotor core 17 side is in contact with another member (the rotor holder 18 in the embodiment), and whose surface in a direction away from the rotor core 17 is open, the farthest surface of the coolant holding portion 42L of the first blade 40F from the rotor core 17 is similarly farther away from the rotor core 17 than the farthest surface of the specific member from the rotor core 17. In short, the cooling structure 100 has a shape that a part of the inner circumference surface of the coolant holding portion 42L of the first blade 40F, the inner circumference surface collecting the coolant, is not hidden by the specific member when the first blade 40F is viewed from the axial center in the direction orthogonal to the axial direction. Consequently, the first blade 40F can also capture the coolant at the coolant holding portion 42L suitably, and cool the coil 24C of the stator 24 efficiently.

Here, it is preferable as in the embodiment that the relative positional relationship between the first blade 40F and the specific member should satisfy the above relationship, and the relative positional relationship between the second blade 40R and the third holder member 18T should satisfy the above relationship. However, the relative positional relationship between the second blade 40R and the third holder member 18T satisfies the above relationship; accordingly, the generator motor 10 can obtain a more significant effect than the case where the above relationship is not satisfied.

In the generator motor 10, the flywheel 14 includes the stator gear 14G; accordingly, it is difficult to place another part between the flywheel 14 and the second blade 40R. Therefore, in the generator motor 10, a space formed between the flywheel 14 and the second blade 40R tends to be larger than a space formed between the flange 12 and the first blade 40F. Consequently, the coolant supplied by the centrifugal force from the center of the rotor holder 18 spreads into the space between the flywheel 14 and the second blade 40R and is supplied more easily; accordingly, the amount of the coolant that reaches the coil 24C of the stator 24 tends to decrease. In contrast, in the cooling structure 100, the cooling structure 100 is provided to capture the coolant supplied by the centrifugal force from the center of the rotor holder 18 once at the coolant holding portion 42R of the second blade 40R and supply the captured coolant from the coolant drain hole 41R to the coil 24C of the stator 24. Consequently, even if the space formed between the flywheel 14 and the second blade 40R is large, the generator motor 10 can suppress the coolant flying in various directions in the space formed between the flywheel 14 and the second blade 40R, and supply the coolant to the coil 24C of the stator 24 efficiently.

The cooling structure 100 can increase the distance W by thinning the third holder member 18T. The generator motor 10 and the cooling structure 100 can lighten the whole weight of the rotor 20 by thinning the third holder member 18T, and accordingly can improve inertia. Moreover, the cooling structure 100 can make the shapes of the coolant holding portions 42F and 42R of the first blade 40F and the second blade 40R the same and increase the distance W by adjusting the distance W with the thickness of the third holder member 18T. The cooling structure 100 can be manufactured with the same mold by making the shapes of the coolant holding portions 42F and 42R the same, in short, making the shapes of the second portion 44F and the third portion 45F of the first blade 40F and the second portion 44R and the third portion 45R of the second blade 40R the same (in other words, the lengths in the radial and axial directions of the end face (the second portion 44F) of the first blade 40F, and the lengths in the radial and axial directions of the portion (the third portion 45F) extending radially inward at the farthest position from the rotor core equal to the relevant portions of the second blade 40R). The mold for manufacturing is made the same in this manner; accordingly, it is possible to reduce the manufacturing cost. The first portions 43F and 43R have a hollow disc-shaped structure by punching or the like after being manufactured by casting or the like. Moreover, the coolant drain holes 41F and 41R can be formed by manufacturing the second portions 44F and 44R by casting or the like and subsequently opening through holes by machining.

Moreover, in the cooling structure 100, the protrusions 46R are provided to the second blade 40R; accordingly, it is possible to suitably cause the coolant captured and collected at the coolant holding portion 42R to head for the coolant drain hole 41R, and suitably supply the coolant from the coolant drain hole 41R toward the coil 24C. The same applies to the first blade 40F. Preferably, the first blade 40F and a coolant 40L are provided with the protrusions 46R and 46L since the coolant can be discharged efficiently, but are not limited to this. The first blade 40F and the coolant 40L may have a construction where the protrusions 46R and 46L are not provided. In short, the first blade 40F and the coolant 40L may be one recess where the coolant holding portions 42R and 42L are linked in the circumference direction. Also in this case, it is preferable that a plurality of the coolant drain holes 41R and 41L is provided in the circumference direction.

Moreover, in the cooling structure 100, the coolant drain hole 41R is formed adjacently to the front side (the upstream side, the side passing first upon rotation) of the protrusion 46R in the rotation direction of the second blade 40R; accordingly, it is possible to form the coolant drain hole 41R in an area where the coolant captured at the coolant holding portion 42R gathers by the rotation of the second blade 40R. Consequently, the cooling structure 100 can appropriately supply the coolant captured at the coolant holding portion 42R radially outward from the coolant drain hole 41R.

Figure 15:
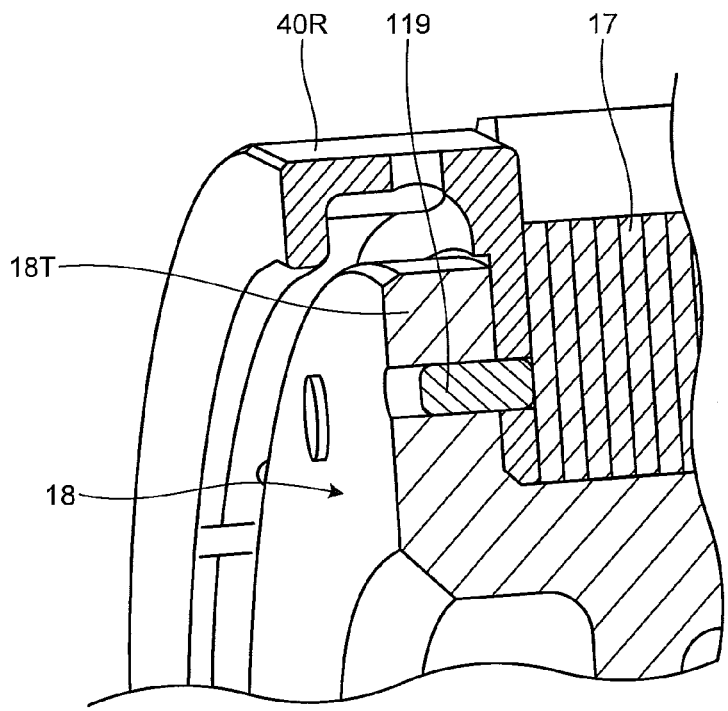
FIG. 15 is a perspective view illustrating another embodiment of a fastening element that connects the rotor holder and the blade.

FIG. 15 is a perspective view illustrating another embodiment of a fastening element that connects the rotor holder and the blade. The rotor holder 18 and the second blade 40R, which are illustrated in FIG. 15, are fastened with a fastening element 119. The fastening element 119 is buried in a hole formed in the third holder member 18T of the rotor holder 18. In short, the fastening element 119 is placed closer to the rotor core 17 side than the farthest surface of the third holder member 18T from the rotor core 17, and fastens the rotor holder 18 and the second blade 40R. Consequently, the fastening element 119 can suppress the inhibition of movement of the coolant passing through the area facing the third holder member 18T from radially inward to radially outward, and can capture the coolant at the coolant holding portion 42R more suitably.

As illustrated in FIG. 14, the rotor holder 18 includes an inclined portion 18S radially inward of an end face 18TP of the third holder member 18T. The distance of the inclined portion 18S from the rotation center axis Zr increases progressively toward the end face 18TP in a direction in parallel with the rotation center axis Zr. In other words, the inclined portion 18S is a bell-mouthed portion that widens out from the inside of the rotor holder 18 toward the end face 18TP in the rotation center axis Zr direction. The rotor holder 18 includes the inclined portion 18S; accordingly, the coolant $L_1$ supplied from radially inward to radially outward of the rotor holder 18 becomes easy to flow into the coolant holding portion 42R of the second blade 40R. Therefore, the cooling structure 100 can efficiently collect the coolant $L_1$ heading radially outward of the rotor holder 18 in the cooling holding portion 42R of the second blade 40R and release the coolant from the coolant drain hole 41R toward an coil end. In this manner, the cooling structure 100 including the inclined portion 18S at the rotor holder 18 can supply the coolant $L_1$ to a coil end suitably and cool it efficiently.

Reference Signs List
- 1 Hybrid excavator
- 2 Undercarriage
- 3 Upper structure
- 6 Internal-combustion engine
- 6S Output shaft
- 7 Hydraulic pump
- 7S Input shaft
- 10 Generator motor
- 11 First housing
- 12 Flange
- 13 Second housing
- 14 Flywheel
- 15 Connection member
- 16 Input/output shaft
- 17 Rotor core
- 18 Rotor holder
- 18Li First holder member
- 18Lo Second holder member
- 18T Third holder member
- 20 Rotor
- 24 Stator
- 24C Coil
- 24I Insulator
- 24K Stator core
- 32 First passage
- 32i Inside first passage
- 32o Outside first passage
- 32H First passage outlet
- 32I First passage inlet
- 33 Second passage
- 33H Second passage outlet
- 40F First blade
- 40R Second blade
- 50F First bearing
- 50R Second bearing
- 51 Spacer
- 60 Protruding portion
- 70 Bearing mounting member
- 71 Through hole
- 80 Rib
- 100 Cooling structure (cooling structure of a generator motor)
- Zr Rotation center axis

The invention claimed is:

1. A cooling structure of a generator motor including a coil of a stator, the coil being placed outside a rotor core in a radial direction, the cooling structure comprising:
    a rotor holder for rotating together with an input/output shaft of the generator motor and discharging, to outward in the radial direction by a centrifugal force, a coolant supplied from inward in the radial direction;
    a rotor core, supported outside the rotor holder in the radial direction, for rotating together with the rotor holder;
    a first blade, placed at an end in an axial direction of the rotor core, for holding one end of the rotor core; and
    a second blade, placed at an end in the axial direction of the rotor core, for holding the other end of the rotor core, wherein
    the second blade includes
        a recessed coolant holding portion, provided on an outer circumference of the second blade on an opposite side to the rotor core and opening inward in the radial direction, for collecting a coolant supplied from inward in the radial direction,
        a drain hole radially penetrating an outer circumference of the coolant holding portion for draining the coolant collected in the coolant holding portion outward in the radial direction of the second blade, and
    wherein the second blade has a plurality of protrusions extending in the axial direction, the protrusions being formed at the coolant holding portion at predetermined intervals in a circumference direction.

2. The cooling structure of a generator motor according to claim 1, wherein the second blade has a part of an inner circumference surface for collecting the coolant of the coolant holding portion, the part being formed in a direction farther away from the rotor core than the rotor holder in the axial direction.

3. The cooling structure of a generator motor according to claim 1, wherein the drain hole is adjacent to a surface on a front side of the protrusion in a rotation direction.

4. The cooling structure of a generator motor according to claim 1, wherein a length in a radial direction of an outside end face in a radial direction of the first blade, a length in an axial direction of the outside end face of the first blade, a length in a radial direction of a portion extending radially inward at a farthest position from the rotor core of the first blade, and a length in an axial direction of the portion of the first blade are equal to those of the second blade.

5. The cooling structure of a generator motor according to claim 1, wherein a surface on a side of the rotor core of a portion of the coolant holding portion, the portion extending radially inward at a farthest position from the rotor core, and a farthest surface of the rotor holder from the rotor core have a predetermined distance therebetween in the radial direction.

6. The cooling structure of a generator motor according to claim 1, wherein the coolant drained from the drain hole is dispersed on a coil end of a coil for cooling.

7. A generator motor comprising a cooling structure of a generator motor including a coil of a stator, the coil being placed outside a rotor core in a radial direction, the cooling structure comprising:
    a rotor holder for rotating together with an input/output shaft of the generator motor and discharging, to outward in the radial direction by a centrifugal force, a coolant supplied from inward in the radial direction;

a rotor core, supported outside the rotor holder in the radial direction, for rotating together with the rotor holder;

a first blade, placed at an end in an axial direction of the rotor core, for holding one end of the rotor core; and a second blade, placed at an end in the axial direction of the rotor core, for holding the other end of the rotor core, wherein the second blade includes a recessed coolant holding portion, provided on an outer circumference of the second blade on an opposite side to the rotor core and opening inward in the radial direction, for collecting a coolant supplied from inward in the radial direction, a drain hole radially penetrating an outer circumference of the coolant holding portion for draining the coolant collected in the coolant holding portion outward in the radial direction of the second blade, and wherein the second blade has a plurality of protrusions extending in the axial direction, the protrusions being formed at the coolant holding portion at predetermined intervals in a circumference direction.

8. The generator motor according to claim 7, wherein an end of the input/output shaft is coupled to an output shaft of a power generation source, and the other end of the input/output shaft is coupled to an input shaft of an object to be driven by power of the power generation source.

9. The generator motor according to claim 8, wherein the second blade is placed on a side of the power generation source of the rotor core.

* * * * *